No. 700,878. Patented May 27, 1902.
A. WOLLENSAK.
PHOTOGRAPHIC SHUTTER.
(Application filed Oct. 23, 1901.)
(Model.) 3 Sheets—Sheet 1.
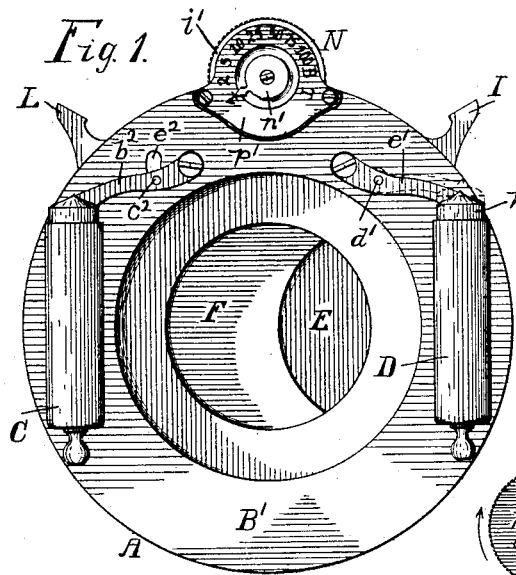
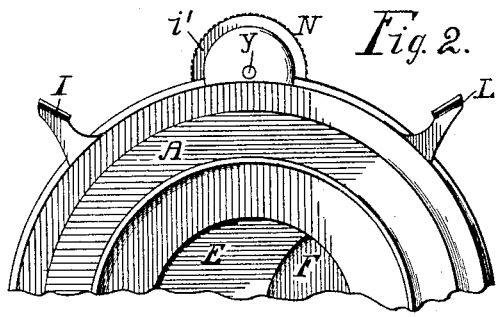
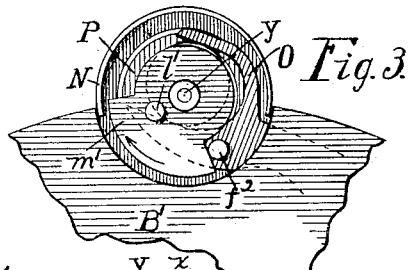
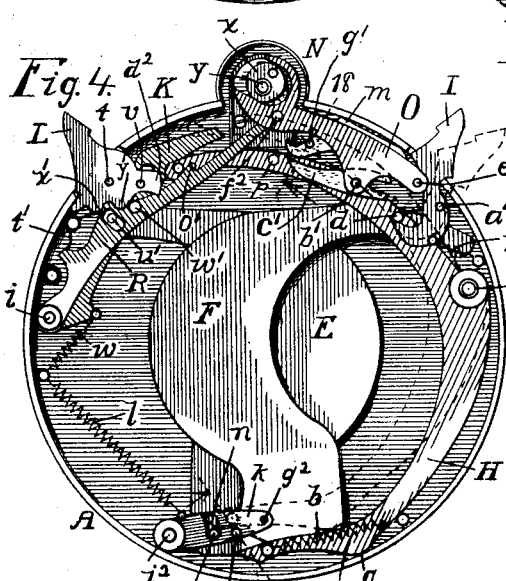
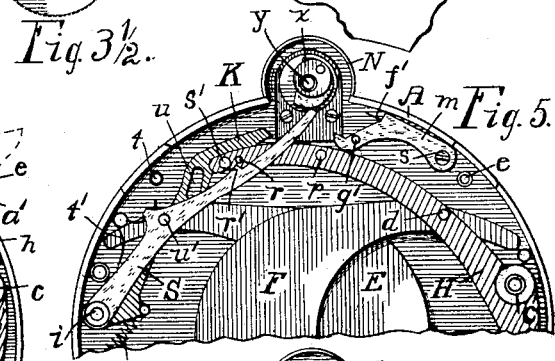
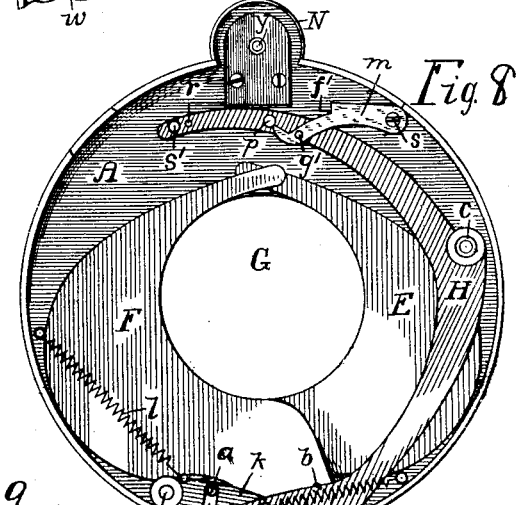
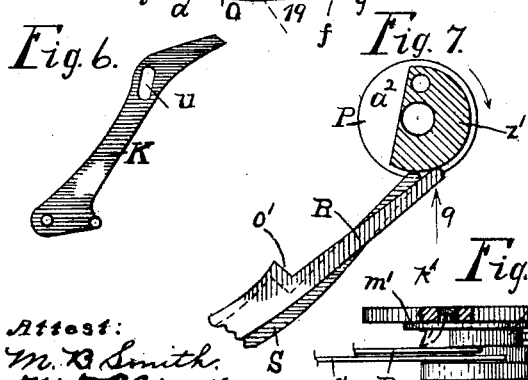
Attest:
M. B. Smith.
M. S. Phillips.
Inventor:
A. Wollensak.
By E. B. Whitmore, Atty.
THE NORRIS PETERS CO., PHOTO-LITHO., WASHINGTON, D. C.

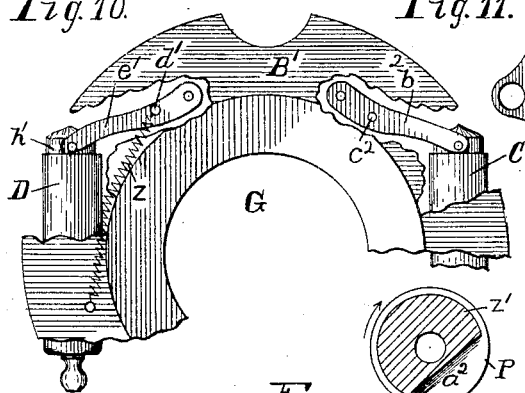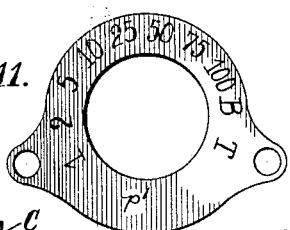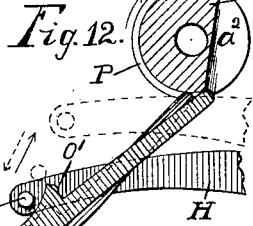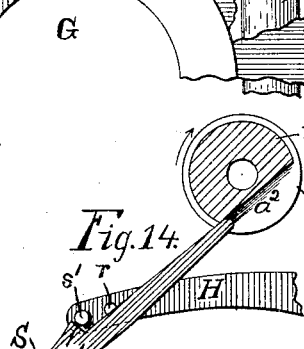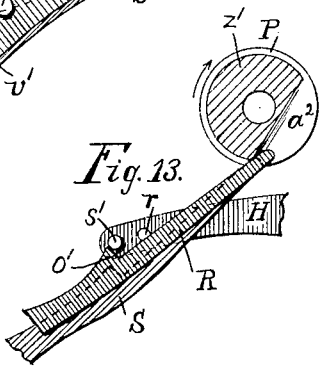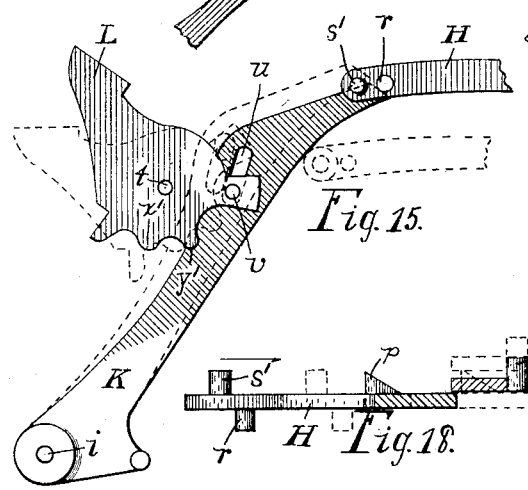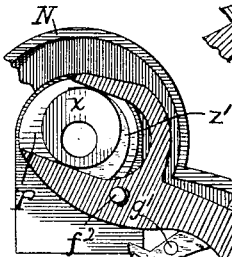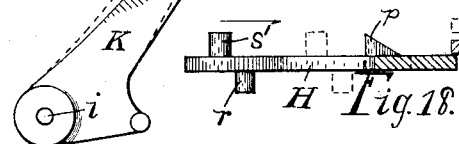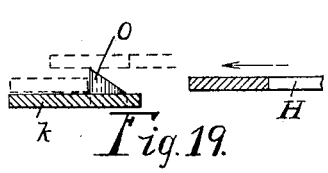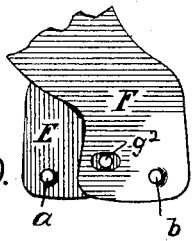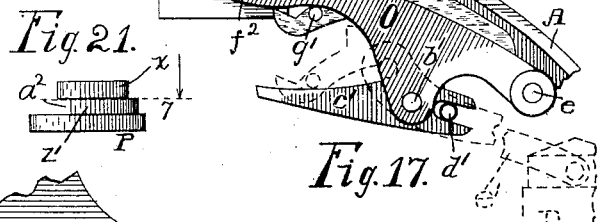

No. 700,878. Patented May 27, 1902.
A. WOLLENSAK.
PHOTOGRAPHIC SHUTTER.
(Application filed Oct. 23, 1901.)
(Model.) 3 Sheets—Sheet 3.
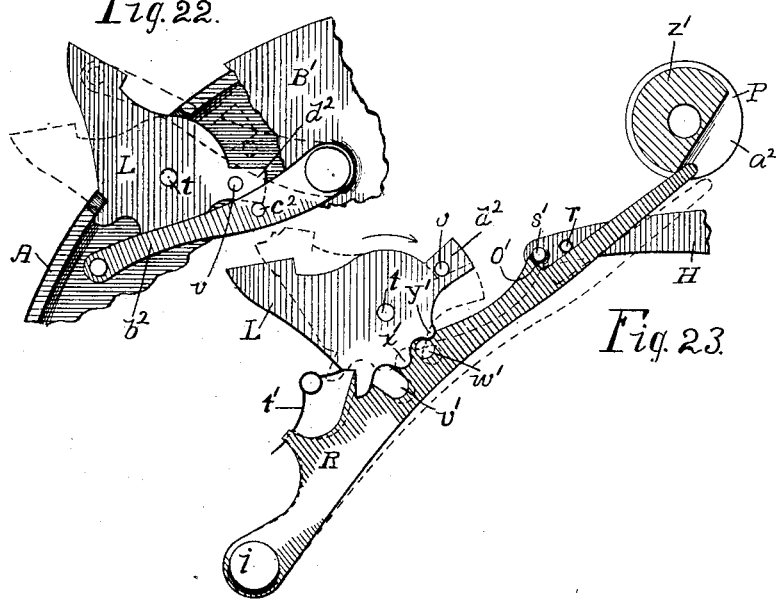
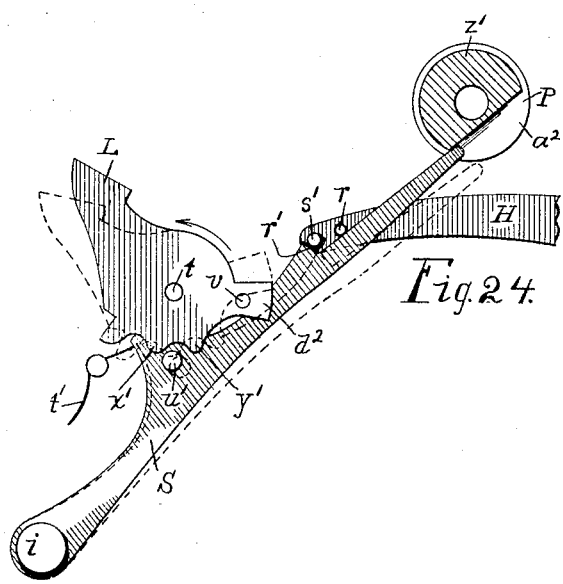
Attest:
M. B. Smith
M. D. Phillips
Inventor:
A. Wollensak
By C. B. Whitmore, Atty.

UNITED STATES PATENT OFFICE.

ANDREW WOLLENSAK, OF ROCHESTER, NEW YORK.

PHOTOGRAPHIC SHUTTER.

SPECIFICATION forming part of Letters Patent No. 700,878, dated May 27, 1902.

Application filed October 23, 1901. Serial No. 79,714. (Model.)

*To all whom it may concern:*

Be it known that I, ANDREW WOLLENSAK, of Rochester, in the county of Monroe and State of New York, have invented a new and useful Improvement in Photographic Shutters, which improvement is fully set forth in the following specification and shown in the accompanying drawings.

My invention is an improved photograph shutter designed to make bulb and time exposures and a series of graded exposures ranging in duration from brief time to instantaneous, the invention being hereinafter fully described, and more particularly pointed out in the claims.

One object of the invention is to produce a shutter in which the retarding mechanism is independent of the mechanism that actuates the shutter-blades.

Another object of the invention is to have the setting-lever held to act independent of both the shutter mechanism and the retarding mechanism.

A further object of the invention is to construct the device so that the motor mechanism for the shutters and the retarding mechanism shall have a controlling-body common to both.

A further object of the invention is to so construct the device that the release-lever shall control singly all the detents for the mechanism producing all of the exposures.

Other objects of the invention and the novel construction, arrangement, and actions of the parts thereof will be brought out and made to appear in the following specification, reference being had to the accompanying drawings, in which—

Figure 1 is a front view of the shutter. Fig. 2 is a rear view of the upper parts of the shutter. Fig. 3 is a front view of upper parts of the shutter, parts being removed. Fig. 3½ is a detail. Fig. 4 is a front view of the inner parts of the shutter, the front plate being removed, parts being shown in two positions by full and dotted lines. Fig. 5 is a front view of upper interior parts, some parts being omitted. Fig. 6 is a plan of the primary detent-finger. Fig. 7 is a plan of the primary controlling-body or controller transversely sectioned as on the dotted line 7 in Fig. 21. Fig. 8 shows some of the interior parts of the device at the instant preceding the termination of the exposure. Fig. 9 is a view of the primary controller and some associated parts seen as indicated by arrow 9 in Fig. 7. Fig. 10 is a view of the inner or rear surface of the front closing-plate, partly broken away, and attached parts. Fig. 11 is a plan of the dial. Figs. 12, 13, and 14 are plans showing different positions of the primary controller, partly in transverse section, and associated parts. Fig. 15 is a plan of the primary detent and the release-lever with a part of the masterarm shown in various positions by full and dotted lines. Figs. 16 and 17 show the eccentric-arm and associated parts of the retarding mechanism occupying different positions, parts being shown in various positions by full and dotted lines. Fig. 18 is a transverse section of the master-arm and dog, taken as on the dotted line 18 in Fig. 4, the dog being shown in various positions by full and dotted lines. Fig. 19 is a transverse section of the master-arm and the exposure-lever, taken as on the dotted line 19 in Fig. 4. Fig. 20 is a plan of the lower ends of the closing-blades. Fig. 21 is a side elevation of the primary controller, better showing the cavity therein. Fig. 22 is a plan of the release-lever and the left face-lever, each shown in two positions by full and dotted lines. Fig. 23 is a plan of the releaselever and the upper twin detent, with some associated parts, the lever and the detent being shown in two positions by full and dotted lines. Fig. 24 shows the release-lever and the under detent and associated parts, the lever and the detent shown as occupying two positions each by full and dotted lines. Figs. 1, 2, 3½, 4, 5, 6, 8, 10, and 20 are drawn full size, Figs. 3, 7, 9, 11 to 17, 21, 22, 23, and 24 to a scale double size, and Figs. 18 and 19 to a scale quadruple in size.

Referring to the parts shown, A is the hollow inclosing case for the operating parts, it being circular in form and preferably of metal.

B is the front plate or cover for the case A, carrying vertical pumps or air-valves C D, Figs. 1 and 10, for bulb and graded work, respectively.

E F are the closing-blades (of common construction) for the exposure-opening G, Fig. 8, held to turn on pins $a$ and $b$, respectively, both pins being rigid in the rear wall of the case A.

H, Figs. 4 and 8, is a curved master-arm pivoted upon a stud $c$ and operated by a setting-lever I, held on a pivot $a'$ in the case A in position to engage a pin $d$ of the arm, as shown. This arm is further controlled by a spring $f$, tending to hold it normally, as shown in Fig. 4, the arm touching the outer rim of the case A at $g$. The lever I is controlled by a spring $h$.

$k$, Figs. 4 and 8, is a short exposure-lever pivoted at $i^2$ to the case and controlled by a spring $l$ to hold the closing-blades normally shut, as in Fig. 4. The lever $k$ is formed with a slot $n$ to provide for the pivot-pin $a$ of the blade E, said pin constituting a stop for the return movements of the lever. The lever $k$ engages the shutter-blades E F by means of a pin $g^2$, Figs. 4 and 20, moving them in the usual manner. This lever is further provided with a short inclined stud $o$, Figs. 8 and 19, in position to be engaged by the adjacent end of the arm H as the latter is being returned to its normal position by the spring $f$ after being set by the lever I, as shown by dotted lines in Fig. 4.

K, Figs. 4, 5, and 6, is a primary detent serving to hold temporarily the arm H in its set position, as shown by dotted lines in Fig. 4 and in Fig. 15, said detent engaging a backwardly-projecting pin $r$, near the free upper end of the arm.

$m$, Figs. 5, 8, and 18, is a catch-finger or dog pivoted at $s$ to the case A in position to be caught at its free end by a stud $p$ of the arm H when the latter is returning to its normal position after being raised by the setting-lever I, as described. The stud $p$ is slanting at its projecting end, and when it encounters the dog $m$ during the upward movement of the arm the dog bends forward to let the stud pass, as shown by dotted lines in Fig. 18, the dog springing back to its normal position adjacent to the arm after the stud passes.

L, Figs. 1, 4, and 15, is a release-lever turning on a pin $t$ in the case A, provided with a pin $v$ to engage the detent K. The detent is formed with a slot $u$, Fig. 6, to receive the pin $v$, whereby when the lever is depressed, as indicated by dotted lines in Fig. 15, the detent will be drawn away from the engaging pin $r$ of the arm H, as indicated by dotted lines, thus releasing the arm and allowing it to return to its normal position. The detent K is controlled by a spring $w$, Fig. 4, which holds it normally forward against the pin $v$ as a stop, the detent in turn tending to hold the lever L normally up, as appears in full lines in Fig. 15. When the arm H moves upward, as stated, the pin $r$, pressing the inner curved edge of the detent K, pushes it backward against the action of the spring $w$; but when the pin clears the detent, after passing it, the latter will resume its normal position and catch the pin, as shown in Fig. 15, and so temporarily hold the arm from returning to normalcy. The stud $o$ of the exposure-lever $k$ being inclined, as stated, the arm H bends and glides over it, as indicated in Fig. 19, without disturbing the lever $k$ when said arm moves upward to its set position; but when the arm returns to its normal position it will carry the lever with it, and so open the blades E F to make an exposure. Fig. 8 shows the positions of the parts at the instant preceding the termination of an exposure. The arm H, which has pressed the lever $k$ downward to open the blades, still engaging the pin $o$ holds the blades steadily open; but the arm has not yet quite returned to its normal place, the contact-point $g$ being still apart from the rim of the case A. A complete return of the arm to its place will serve to release the pin $o$ and allow the lever $k$ and the closing-blades to return to their respective normal positions, and thus terminate the exposure.

The description of the device thus far given has been mainly of the mechanism for instantaneous exposures, the master-arm when released returning to its place without interruption to effect such exposures. By depressing the lever I, Fig. 4, the arm H will be set for action by being raised to the position shown by dotted lines, the corresponding position of the detent K being shown in full lines in Fig. 15. A tilting of the release-lever L to the position shown in Fig. 15 by dotted lines serves to draw the detent back and release the arm H, which in returning to its normal position encounters the stud $o$ of the exposure-lever $k$ and makes an instantaneous exposure.

The inclosing case A is formed with an extended circular chamber or part N, Figs. 1 to 8, occupied by a circular body P, the same constituting a common primary controller for the internal mechanisms of the device. This controller is held to turn on a central stud $y$ in the chamber N, its upper or outer part $x$ being in the form of an eccentric. A bifurcated lever O, Figs. 4, 16, and 17, is provided to coact with the eccentric $x$, as shown, said lever being pivoted at one extreme end to the case A at $e$. When the controller P is turned on its axis, the adjacent end of the lever O will be caused to move up or down, as the case may be, turning always on the center $e$. The extreme upper and extreme lower positions of the lever are shown in Figs. 16 and 17, respectively. This lever carries at its lower side a horizontal pin $b'$, upon which is pivoted a forked lever $c'$, the divided ends of which straddle a pin $d'$ in the right face-lever $e'$, Figs. 1 and 10, said face-lever being connected with the plunger $h'$ of the retarding-pump D. A simple controlling-spring $f'$ is provided for the dog $m$ to hold the latter normally against the rim of the inclosing case A, as shown. This dog is further provided with a short pin $g'$ in position to encounter the forked lever $c'$, as appears in Figs. 16 and 17, when the dog is carried down by the arm H, this moving of the lever $c'$ being independent of the lever O, the former moving while the latter is at rest, and as the movements of the dog are uniform as to distance it will be further observed that as the lever O is carried downward, by degrees, by turning the controller P the free end of the lever $c'$ will be correspondingly depressed or moved downward farther and farther away from the dog $m$, and thus be moved through progressively-decreased distances by the dog as the latter is carried down by the arm H. When the lever O is at its lowest position, the free end of the lever $c'$ will be out of the reach of the dog, and so not be encountered or moved by it. By means of this combined mechanism the plunger $h'$ of the retarding-pump D will be raised more or less, according to the position of the lever O, as appears by dotted lines in Figs. 1 and 16, it being raised through the greatest distance when the eccentric $x$ is turned up, as shown in Fig. 16, holding the lever O at its highest position. A returning-spring $z$, Fig. 10, connected with the pin $d'$ of the lever $e'$, serves to hold the latter and the connected pump-plunger $h'$ normally down, as shown, the lever $c'$ acting to stretch this spring when it lifts the plunger $h'$, as stated.

The lever O, with the pump D and the coacting parts, constitute the retarding device or mechanism for the shutter mechanism when acting for graded exposures. This retardation is effected by the resistance the lever $c'$ offers to the dog $m$ when carried downward by the arm H. When the free end of said lever $c'$ is forced downward through a long distance by the dog, (as when the parts are in the positions shown in Fig. 16,) a resistance of corresponding duration is offered to the return of said arm to its normal place; but when the eccentric is turned to carry the lever O to lower positions the periods of time the arm H is resisted decrease correspondingly, allowing said arm to return successively quicker to shorten the exposure. When the eccentric and the lever O are at their lowest positions, Fig. 17, the arm H is not resisted, and it returns instantaneously to place, effecting an instantaneous exposure.

The primary controller P is actuated by means of a circular disk $i'$, Figs. 1, 2, and 3½, turned by the hand of the attendant. This disk has an opening $k'$, occupied by a pin $l'$, Fig. 3, of a stop-plate $m'$ on the stud $y$, contiguous with the body P, said disk, the stop-plate, and the body P turning together. The disk is provided with a pointer $n'$ to indicate upon an overlying circular graduated plate $p'$ the position of the eccentric $x$ in the forks of the lever O. The arrangement is such that when the pointer indicates "1" on the scale the eccentric stands as shown in Figs. 4, 5, and 16, holding the lever O at its extreme upper position, and when "100" of the scale is indicated by the pointer ("1" and "100" being diametrically opposite on the scale) the eccentric will occupy the position shown in Fig. 17, the lever O being then at its lowest position. The scale, with the knurled disk $i'$ and the pointer, together constitute means for turning the eccentric and the lever O to prearranged positions. The intermediate positions of the eccentric will be indicated by the pointer while passing from "1" through the grades of a half-revolution to "100."

For bulb and time exposures twin detents R S, Figs. 4, 5, 7, 9, and 12, are provided for the master-arm H, copivoted at $i$ with the primary detent K. These twin detents are formed, respectively, with rests $o'$ $r'$ for catching a pin $s'$, Figs. 4, 12 to 14, and 18, of said arm to prevent it from returning fully to its normal position after being released by the lever L. These detents are both urged normally upward or to the left by a simple spring $t'$, held by the case A. The nether detent S has a pin $u'$ extending through an opening $v'$ in the detent R, Fig. 12, the latter detent having also a similar pin $w'$. These pins are in positions to be engaged, respectively, by extended parts or branches $x'$ $y'$ of the release-lever L, by means of which the detents may be pushed to the right or downward to release the arm H. These detents are unequal in length, and to further control them the primary controller P is formed with a clipped or mutilated cylindrical part $z'$, Figs. 7, 9, and 12 to 14, to engage their extreme ends, as shown. The detents touch the convex surface of the part $z'$ at points one in advance of the other, the rests $o'$ and $r'$ being also one above the other. When graded exposures are being made, the ends of the twin detents press the convex surface of the part $z'$, their relative positions being shown in Fig. 7 when the pointer $n'$ indicates "1" on the scale and in Fig. 12 when the pointer indicates "100." While the body P is being thus turned through a half-revolution for graded exposures, the ends of the detents hold steadily to their places on the convex surface of the part $z'$, both detents idling, the pin $s'$ of the arm H clearing both as the latter is moved up or down. When, however, the pointer is advanced to "B" on the scale, indicating bulb exposures, the part $z'$ will assume the position shown in Fig. 13, permitting the long detent R to advance by moving into the cavity $a^2$. In this new position of the detent R the rest $o'$ will be in position to catch the pin $s'$ as the arm H descends, and so hold it and temporarily continue the exposure. When the pointer is turned to indicate "T" on the scale, (for time exposures,) the part $z'$ will stand as shown in Fig. 14. This will allow the detent S to swing forward into the cavity $a^2$ and be in position to catch the pin $s'$ as the arm descends and hold the latter from returning truly to its normal position, thus serving to indefinitely continue the exposure. In doing bulbwork the detent R arrests the arm H after being released by the primary detent K by the tilting of the release-lever L, as shown in Fig. 15. So long as the lever L is held in its tilted position (see Fig. 23) by the finger or by bulb-pressure the arm H will be held and the exposure continued; but when the lever is released the spring-actuated detent K will, acting against the pin $v$, return it to its normal place, causing the branch $y'$ to press the pin $w'$ of the detent, and so release the pin $s'$ and permit the arm H to return and terminate the exposure. When the bulb is employed, connected with the pump C, it controls the release-lever L by means of a pin $c^2$ in the left face-lever $b^2$, engaging a projecting part of said lever L. (Clearly shown in Fig. 22.) In making time exposures the release-lever L returns to its normal position after the pin $s'$ of the arm H is caught by the detent S, the positions of the parts being shown in Figs. 8 and 24. A second tilting of the release-lever by the finger to terminate the exposure will cause the branch $x'$ of the lever to press the pin $u'$ of the detent S and release the arm H. The release-lever L by means of its projecting parts $v$ $y'$ $x'$ acts upon the series of detents K R S singly and independently, the detent R being moved while the lever is returning to its normal position, Fig. 23, and the detent S being moved when the lever is turned downward, as indicated in Fig. 24.

The primary controller P is common to both the retarding mechanism and the shutter mechanism. This controller serves at times to hold the twin detent-fingers out of action, while it allows the retarding mechanism to act, to hold the retarding mechanism out of action while the twin detents act and to hold the retarding mechanism and the twin detents all out of action simultaneously. The retarding mechanism is thrown out of action when the pointer indicates "100" on the scale, and it remains out of action while the pointer is moved onto "B" and to "T," said retarding mechanism being idle while both bulb and time exposures are being made. The setting-lever I, it will be observed, is held to be moved independently of both the shutter mechanism and the retarding mechanism, it merely acting to set the arm H and then returning idly to its place without affecting any other part. Also the retarding mechanism and the shutter mechanism act independently of each other, either acting at times without the other. When making graded exposures, the retarding mechanism is brought into action by the shutter mechanism, the latter going through a part of its motion independent of and before it starts the retarding device.

The lever O is provided with a pin $f^2$, Figs. 3, 16, and 17, in position to be encountered by the stop-plate $m'$ one way or the other as the disk $i'$ is turned from one extreme to the other for the full series of exposures. This stop plate and pin prevent the parts in the chamber N from being turned to carry the pointer $n'$ back of "I" on the scale or beyond "T," the two limits of motion of the pointer.

In the matter of the operation of the release-lever L it will be observed that an interval of time elapses between the action of said lever on the shutter mechanism and the action of the latter on the retarding mechanism. For example, in making graded exposures the lever L first releases the master-arm H, which after moving for a time in returning to its normal place acts to cause the forked lever $c'$ to lift the plunger of the retarding-pump D.

What I claim as my invention, and desire to secure by Letters Patent, is—

1. A photographic shutter for making a series of graded exposures comprising, in combination with shutter-blades, mechanism for determining the duration of said various exposures, and motor mechanism for the shutter-blades, said mechanisms being independent of each other, and a controlling-body common to both, substantially as shown and described.

2. A photographic shutter adapted to make a series of graded exposures ranging from brief duration to instantaneous, having mechanism comprising, in combination with shutter-blades, a retarding device for determining the duration of the various exposures, and motor mechanism for the shutter-blades independent of the retarding device, and a controlling-body common to both, substantially as set forth.

3. A photographic shutter for making bulb and time exposures, having, in combination with shutter-blades, a master-arm with intermediate mechanism for moving the shutter-blades, a pair of detents for engaging said arm one for bulb exposures and the other for time exposures, and a release-lever for the exposure mechanism adapted to control both of said detents, substantially as set forth.

4. A photographic shutter for making exposures of different duration, having shutter-blades and mechanism for operating them, and retarding mechanism acting independently of said shutter mechanism and a thumb-lever for setting said shutter mechanim, said thumb-lever being independent of the shutter mechanism, substantially as shown and described.

5. A photographic shutter for making exposures of different duration, having shutter-blades and mechanism for operating them, and retarding mechanism acting independently of the shutter mechanism and a spring-actuated thumb-lever for setting the shutter mechanism, said thumb-lever being adapted to return to its normal place while the mechanism is set and at rest and without affecting said mechanism, substantially as shown and described.

6. A photographic shutter for making a series of exposures graded as to duration, having, in combination with shutter-blades and mechanism for operating them, a setting-lever, and retarding mechanism for determining the durations of the exposures, said retarding mechanism acting independently of the shutter mechanism and being adapted to set in motion the shutter mechanism independent of the setting-lever, substantially as set forth.

7. A photographic shutter for making a series of exposures graded as to duration, having, in combination with shutter-blades and mechanism for operating them, a retarding mechanism for the shutter mechanism acting independently of the shutter mechanism and adapted to be actuated by the shutter mechanism while moving to effect an exposure, substantially as described.

8. A photographic shutter for making a series of exposures graded as to duration, having, in combination with shutter-blades and mechanism for operating them, a retarding mechanism acting independently of the shutter mechanism and actuated by the shutter mechanism and a release-lever for the exposure mechanism, the latter making a part of its return motion independent of the retarding mechanism, substantially as described.

9. A photographic shutter for making a series of exposures graded as to duration, having, in combination with closing-blades and mechanism for operating them, retarding mechanism for the exposure mechanism, actuated by the latter, and a release-lever for the exposure mechanism, there being an interval of time between the action of the release-lever upon the exposure mechanism and the action of the latter upon the retarding mechanism, substantially as set forth.

10. A photographic shutter for making a series of exposures graded as to duration, having, in combination with closing-blades and mechanism for operating them, a retarding mechanism for determining the durations of the exposures, and means for controlling said exposure mechanism, the latter and the retarding mechanism acting independently of each other, substantially as set forth.

11. A photographic shutter adapted to make exposures of different duration, having shutter-blades and mechanism for operating them, a series of detents for the shutter mechanism, and a release-lever to successively engage the detents to control singly and release the shutter mechanism, substantially as set forth.

12. A photographic shutter adapted to make exposures of different duration, having shutter-blades and mechanism for operating them, a pair of detents for the shutter mechanism, and a release-lever controlling singly all of said detents and adapted for operating them moving in one direction to engage one detent and in the opposite direction to engage the other, substantially as shown and described.

13. A photographic shutter adapted to make exposures of different duration, having shutter-blades and mechanism for operating them, and a series of copivotal detents for the shutter mechanism held to move in parallel planes, and a release-lever adapted to be actuated to control the detents singly, substantially as and for the purpose specified.

14. A photographic shutter adapted to make exposures of different duration, having shutter-blades and mechanism for operating them, and a series of copivotal detents for the shutter mechanism, and a release-lever adapted to be actuated by hand or by bulb pressure, said lever having a series of projections one to engage each of the detents, substantially as specified.

15. A photographic shutter adapted to make exposures of different duration, having shutter-blades and mechanism for operating them, a primary detent and twin detents for the shutter mechanism, and a release-lever constructed to control singly all of said detents and adapted for actuating the several detents independently, with means for holding the twin detents out of action, substantially as described.

16. A photographic shutter adapted to make exposures of different duration, having shutter-blades and motor mechanism therefor, a series of detents for the shutter mechanism, comprising two twin detents, and a release-lever to actuate the detents singly, with means for bringing the twin detents successively into action, substantially as and for the purpose set forth.

17. A photographic shutter adapted to make exposures of different duration, having shutter-blades and motor mechanism therefor including a pivoted arm, a series of copivotal detents adapted to engage said arm at different points in its movements, and a release-lever constructed to control singly all of said detents and adapted for controlling the detents, substantially as stated.

18. A photographic shutter adapted to make time, bulb, and graded exposures, comprising shutter-blades and mechanism for operating them, and retarding mechanism for the shutter mechanism, and companion detents for the shutter mechanism to effect time and bulb exposures respectively, and a controlling-body common to both detents and the retarding mechanism, substantially as shown and described.

19. A photographic shutter adapted to make time, bulb, and graded exposures, comprising shutter-blades and mechanism for operating them, and retarding mechanism for the shutter mechanism, and companion detents for the shutter mechanism to effect time and bulb exposures respectively, and a controlling-body common to both detents and the retarding mechanism, said controlling-body being adapted to hold both detents in inaction or to allow them to move into action successively, and to hold the retarding mechanism out of action, substantially as and for the purpose specified.

20. A photographic shutter adapted to make time, bulb, and graded exposures, comprising shutter-blades and mechanism for operating them, and retarding mechanism for the shutter mechanism, and companion detents for the shutter mechanism to effect time and bulb exposures respectively, and a controlling-body common to both detents and the retarding mechanism said controlling-body being adapted to be moved to simultaneously hold said detents and the retarding device out of action, substantially as specified.

21. A photographic shutter adapted to make time, bulb, and graded exposures, comprising shutter-blades and mechanism for operating them, and retarding mechanism for the shutter mechanism, and companion detents for the shutter mechanism to effect time and bulb exposures respectively, and a controlling-body common to both detents and the retarding mechanism, said controlling-body being adapted to hold the retarding mechanism out of action while the detents act, substantially as set forth.

22. A photographic shutter adapted to make time, bulb, and graded exposures, comprising shutter-blades and mechanism for operating them, and retarding mechanism including an eccentric arm, for the shutter mechanism, and a controlling-body common to both said mechanisms engaging the eccentric arm, there being detents for the shutter mechanism engaged by said controlling-body, the latter having in part the form of an eccentric and in part the form of a mutilated disk, substantially as shown and described.

23. A photographic shutter adapted to make graded exposures, having shutter-blades and mechanism for operating them, and a retarding device for controlling the exposure mechanism, and a spring for returning the retarding device to its normal place, substantially as shown and described.

24. A photographic shutter adapted to make graded exposures, having shutter-blades and mechanism for operating them, and a retarding device for the shutter mechanism comprising an arm pivoted at one end, an air-pump, and a lever carried by said arm to operate the pump, and means for turning the arm to prearranged positions, and to operate said lever, substantially as and for the purpose set forth.

25. A photographic shutter adapted to make graded exposures, having shutter-blades and mechanism for operating them, and a retarding device for the shutter mechanism comprising a pivotal arm, an air-pump, and a lever carried by said arm movably connected with the air-pump, with means to move the lever independent of the carrying-arm, substantially as set forth.

26. A photographic shutter adapted to make graded exposures, having shutter mechanism, and retarding mechanism for controlling the shutter mechanism, comprising a pump-barrel with plunger therein, a pivoted arm and means to control it, a lever held pivotally by said arm and connected with said plunger, and means independent of the pivoted arm to move the lever through distances varying according to the position of the pivoted arm, substantially as and for the purpose specified.

27. A photographic shutter adapted to make graded exposures, having shutter mechanism, and retarding mechanism comprising a pivoted arm for controlling the shutter mechanism, and means including a graduated scale and indicator therefor, for controlling the pivoted arm, substantially as set forth.

In witness whereof I have hereunto set my hand this 19th day of October, 1901, in the presence of two subscribing witnesses.

ANDREW WOLLENSAK.

Witnesses:
MINNIE SMITH,
ENOS B. WHITMORE.